(12) United States Patent
Maloney

(10) Patent No.: US 9,048,706 B1
(45) Date of Patent: Jun. 2, 2015

(54) SMALL SCALE RENEWABLE ENERGY POWER GENERATING APPARATUS

(71) Applicant: NAUTICAL TORQUE TECHNOLOGY, INC., Walnut Creek, CA (US)

(72) Inventor: Cahill C. Maloney, San Francisco, CA (US)

( * ) Notice: Subject to any disclaimer, the term of this patent is extended or adjusted under 35 U.S.C. 154(b) by 0 days.

(21) Appl. No.: 13/924,531

(22) Filed: Jun. 21, 2013

Related U.S. Application Data

(60) Provisional application No. 61/662,862, filed on Jun. 21, 2012.

(51) Int. Cl.
| | | |
|---|---|---|
| *F03G 3/00* | (2006.01) |
| *H02K 7/18* | (2006.01) |
| *F03B 13/00* | (2006.01) |
| *F03D 9/00* | (2006.01) |

(52) U.S. Cl.
CPC ............. *H02K 7/1853* (2013.01); *F03B 13/00* (2013.01); *F03D 9/002* (2013.01)

(58) Field of Classification Search
USPC .......................................................... 290/1 R
See application file for complete search history.

(56) References Cited

U.S. PATENT DOCUMENTS

| | | | | |
|---|---|---|---|---|
| 7,768,142 | B2 * | 8/2010 | Cieslak, Jr. .................. | 290/1 R |
| 8,089,167 | B2 * | 1/2012 | Alvite ............................ | 290/1 C |
| 2013/0033041 | A1 * | 2/2013 | Booher et al. ................. | 290/52 |
| 2013/0270835 | A1 * | 10/2013 | Pingitore et al. ............. | 290/1 A |
| 2014/0217733 | A1 * | 8/2014 | Kroecker ....................... | 290/53 |
| 2014/0327247 | A1 * | 11/2014 | Calabro ....................... | 290/4 C |

* cited by examiner

*Primary Examiner* — Joseph Waks
(74) *Attorney, Agent, or Firm* — Michael W. Caldwell; Matlock Law Group, PC

(57) ABSTRACT

An apparatus uses mechanical means to allow low volume, intermittent air or water or other energy sources to provide electrical power through a power train connected to an electrical generator.

11 Claims, 1 Drawing Sheet

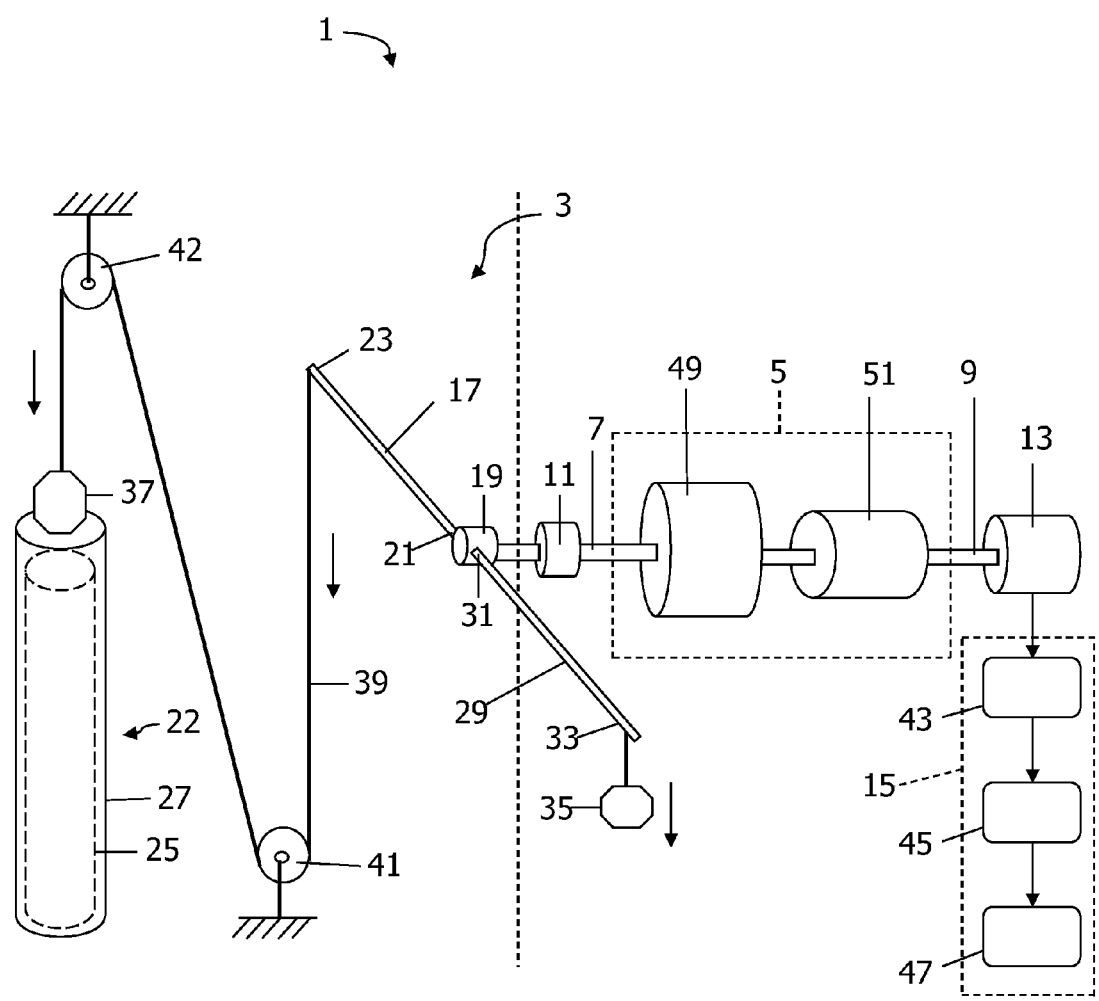

SMALL SCALE RENEWABLE ENERGY POWER GENERATING APPARATUS

CROSS REFERENCE TO RELATED APPLICATIONS

This application is related to commonly-owned U.S. Provisional Patent Application, Ser. No. 61/662,862 submitted 21 Jun. 2012 by Cahil C. Maloney, from which priority is hereby claimed, and which is hereby incorporated by reference in its entirety.

FIELD OF THE DISCLOSURE

The subject matter herein relates generally to apparatus and method for power generation, and more particularly to power generation using renewable energy sources such as low pressure compressed air and low volume water stream.

BACKGROUND OF THE INVENTION

Renewable energy sources that do not depend on photons from the sun or chemical processes utilize the mechanical power of moving masses. Among these, conventional hydro-electric power requires a large amount of water that is fast enough to turn the rotary blades of a turbine. Wind power requires strong wind to turn a wind turbine. Compressed air power requires a large amount of compressed air under high pressure, which when released, drives an air turbine that turns a generator. The foregoing are generally large industrial size machines that require large capital investment and are not adaptable for small size generators that supply power for one or a few households.

On the technical side, when a stream of water is small, or when the stream is intermittent, conventional hydroelectric power powered by hydro-turbines functions inefficiently or does not function at all. With regard to compressed air, when the flow of air is small and/or inconsistent, the conventional generators either do not work or work poorly. Therefore, there is a need for an apparatus and method to capture power sources, water, or compressed air that is small or inconsistent. The apparatus needs to be inexpensive and be able to supply power for one or a few households.

BRIEF DESCRIPTION OF THE DRAWINGS

FIG. 1 is a schematic diagram of a renewable energy power generating apparatus according to the present disclosure.

DETAILED DESCRIPTION OF THE INVENTION

The present disclosure provides methods and apparatus that are suitable for small scale power generation, capable of capturing and accumulating power from inconsistent or intermittent energy sources including water, wind, and/or compressed air. The power is accumulated and averaged by mechanical devices, and then efficiently converted to electricity. If needed, the electricity may be further accumulated in batteries and then discharged as needed.

In one embodiment of the present invention as shown in FIG. 1, a power generating apparatus 1 includes one or more drive units 3; an accelerating gear box unit 5 with an input 7 and an output 9; one or more coupling means 11 connecting the drive units 3 to the input of the gear box unit 5; and an electric generator 13 connected to the output 9 of the gear box unit 5, wherein the drive unit 3 may be adapted to produce at an output speed of between one turn per minute and one turn per day. The electricity generated from the electric generator 13 may be fed into the input of an electrical unit 15, which regulates the electricity, and output the electricity in a usable form.

In one aspect of the embodiment, the drive unit 3 includes a first drive arm 17 rigidly connected to an axel 19 at a first end 21 of the drive arm; and a compressed air driven power source 22 adapted to exert a force against a second end 23 of the drive arm 17. The axel may be supported on the frame of the power generating apparatus 1 or otherwise mounted in a fixed axel bearing. As a result, the linear or nearly linear motion of the compressed air driven power source may be converted to angular motion at the axel.

The compressed air driven power source 22 may include an inflatable air bag 25 fitted inside a cylindrical hollow cylinder 27. The air bag 25 may be adapted to move the second end 23 of the first drive arm when the air bag 25 is inflated, causing the drive arm to turn around the axel. The compressed air driven power source may also include a sealed air cylinder with piston. When compressed air is charged into the cylinder, the piston moves and pushes the end of the first drive arm. The compressed air power source may be connected to the second end 23 of the first drive arm via a rigid rod or a flexible cord depending on the configuration of the apparatus.

In another aspect of the embodiment, the drive unit 3 includes a second drive arm 29. The first end 31 of the second drive arm 29 may be rigidly connected to the axel 19, and the second end 33 of the second drive arm may be connected to a counter balance weight 35. A weight load 37 may be connected to the second end 23 of the first drive arm via a cable 39 routed through one or more pulley wheels 41, 42. The first drive arm 17 and the second drive arm 29 are about the same length. The weight load 37 may be about twice as heavy as the counter balance weight 35.

When compressed air is charged into the compressed air driven power source 22, the air bag 25 is inflated and raises the weight load 37. The force pulling down on the second end 23 of the first drive arm is released. The counter balance weight 35 pulls down on the second end 33 of the second drive arm 29, resulting in clockwise torque and rotary motion at the axel 19, which may be accelerated through the accelerating gearbox unit, driving the electric generator 13.

When compressed air is released from the air bag 25, the weight load 37, being heavier than the counter-balance weight 35, pulls down the second end 23 of the first drive arm 17, resulting in counter-clockwise torque and rotary motion at the axel, which may be accelerated through the accelerating gearbox unit 5, driving the electric generator 13 to rotate in an opposite direction.

In some aspects of the embodiment, the compressed air for driving the air driven power source may be stored in a compressed air storage device. The compressed air may be produced by a wind-driven air compressor, an electric air compressor, or may be taken from some industrial waste compressed air source.

In another aspect of the embodiment, the drive unit 3 includes one or more micro-dam buoyancy engines (not shown), each including a water container and a floater movably placed inside the water container, the floater being connected to the coupling means. When water is charged into the container, the water raises the floater up by buoyancy force. When water is discharged from the container, the floater drops down with the water level. The up and down motion of the floater may be converted to rotary motion by drive arms, or cord and pulley wheel similar to the configuration described previously herein with air driven power sources.

With one air driven or water driven drive unit 3, the output of the drive unit 3 may not be constant. The output changes directions, and the power level may be uneven. As a result, energy may be wasted because the gear boxes and the electric generator 13 need to change spin directions in every cycle. The power capacity of the gear box, electric generator 13, and electric circuits are under-utilized because they need to accommodate the peak power, but the system does not run at peak power. Rather, the power level may be cyclically up and down.

To overcome these deficiencies, the power generating apparatus 1 may include more than one drive units 3, each of which may be connected to a coupling means 9. In some aspects of the embodiment, the coupling means 9 includes one or more overrunning clutches (not shown), allowing the gearbox and the electric generator 13 to turn at one direction only, and also allowing more than one drive units 3 to work harmoniously in the same system.

In some other aspects of the embodiment, the power generating apparatus 1 includes more than one drive units 3, wherein the coupling means 9 includes a crankshaft (not shown), each of the drive units 3 being connected to a throw of the crankshaft, converting the reciprocating motion of the drive units 3 to rotating motion of the crankshaft. For example, the power generating apparatus 1 may include six drive units 3 working sequentially. They are able to produce a continuous and relatively smoother rotational output in a working principle similar to a 6-cylinder internal combustion engine.

In another aspect, the accelerator gear box unit 5 may include one or more pulley wheels and belts. The accelerator gear box unit 5 may also include more than one chain rings and chains.

The accelerator gear box unit 5 may include one or more fixed-ratio linear helical gearboxes connected in series. The accelerator gear box unit 5 may also include a combination of pulley wheels, belts, chain rings, chains, and helical gearboxes.

In yet another aspect, the electrical unit 15 of the power generating apparatus 1 may include a power conditioner 43, an input of the power conditioner being connected to an output of the electric generator 13, and an output of the power conditioner being connected to a battery device 45, the power conditioner being adapted to charge the battery device.

In a further aspect, the power generating apparatus 1 may include an inverter 47, an input of the inverter being connected to an output terminal of the battery device 45, and power output of the inverter 47 being provided for household electric use or for being sent to the electric grid.

The invention may be further understood by description of a exemplary implementation. A power generating apparatus 1 has a fixed frame (not shown). The drive unit 3 includes an axel 19 supported on a axel bearing fixed on the frame. The axel is connected to a first drive arm 17 and a second drive arm 29, each of which may be about seven feet long and of a rigid material, for example a steel beam. The first drive arm 17 is connected to a weight load 37 through a steel cord 39 routed via a first pulley wheel 41 fixed on the floor and a second pulley wheel 42 at the top of the frame. A weight load 37 of about 600 pounds is connected at the end of the steel cord 39. The weight load 37 is placed at the top of a compressed air driven power source 28. A counter balance weight 35 of about 300 pounds is connected to the end 33 of the second drive arm 29.

The compressed air driven power source 28 includes a vertical hollow cylinder 27 (about 8-foot high and 1.5-foot in diameter) and an inflatable airbag 25 placed inside the cylinder. At a resting state, the air bag 25 is deflated, and the weight load 37 is hung low inside the cylinder 27. When the air bag 25 is inflated by a compressed air source, the air bag 25 produces 600 pounds of force to raise the weight load 37. The counter balance weight 35 is in full force to pull the second end 33 of the second drive arm 29 down, producing 300 lb×7 ft=2,100 lb-ft of torque. As the air bag 25 is fully inflated, the weigh load 37 is raised to the top of the cylinder 27, and the drive arms 17, 23 have been turned a certain angle in one direction. When the air bag 25 is deflated, the weight load 37 drops down with a 600-pound force pulling down the second end 23 of the first drive arm 17. Because of the 300 lb counter balance weight 35 on the second drive arm 29 cancelling out 300 lb of the force, the net torque is (600−300) lb×7 ft=2,100 lb-ft, but at an opposite direction from the first half cycle. As the air bag 25 inflates and deflates in cycles, the drive arms are pulled up and down, turning the axel back and force.

In this exemplary, because there is only one drive unit 3, the connecting means 9 does not include an overrunning clutch or crankshaft. The connecting means 9 is a fixed connecting plate connecting the axel of the drive arms to the input of the accelerating gearbox unit. The accelerator gearbox unit 5 includes a 26:1 linear gearbox 49, a 50:1 linear gearbox 51, and a 4:1 pulley wheel (not shown) combination connected in series. The entire accelerator gearbox unit 5 thus gives acceleration of 26×50×4=5,200 times. If the drive unit 3 produces a rotational speed of one rotation every minute, the electric generator 13 rotates at 1×5,200=5,200 rpm.

The power of the system is calculated as follows. The airbag is inflated and deflated in one-minute cycles. The weight load is raised 7 feet in each cycle. The work is 600 lb×7 feet×4.45 Newton/lb×0.305 m/ft=5,698 Joules. Power=5,698 J/60 seconds=95 watts average.

In this exemplary system, a 12-volt permanent-magnet DC electric generator 13 was used, and the electric power produced was measured to reach 13 volts. A light bulb was connected to the electric output, and the light bulb was brightly lit when the power generating device was operating.

Persons of ordinary skill in the art will realize that the foregoing description is illustrative only and not in any way limiting. Other modifications and improvements will readily suggest themselves to such skilled persons having the benefit of this disclosure.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A power generator, comprising:
   one or more drive units;
   an accelerating gear box unit with an input and an output;
   one or more coupling means connecting the drive units to the input of the gear box group; and
   an electric generator connected to the output of the gear box group,
   wherein said drive units output at a speed between one turn per minute and one turn per day, exclusive.

2. The power generator of claim 1, wherein said drive unit comprises:
   a drive arm rigidly connected to an axel at a first end of said drive arm; and
   a compressed air driven power source adapted to exert a force against a second end of said drive arm.

3. The power generator of claim 2, wherein said compressed air driven power source includes an inflatable air bag fitted inside a cylindrical hollow cylinder, said air bag being adapted to push said second end of said drive arm when said air bag is inflated, causing said drive arm to turn around said axel.

4. The power generator of claim 3, further comprising a compressed air storage device and a wind-driven air compressor.

5. The power generator of claim 1, wherein said drive units comprises one or more micro-dam buoyancy engines, each of which including a cylindrical water container and a floater movably inside said water container, said floater being connected to said coupling means.

6. The power generator of claim 1, comprising more than one drive units, each of which is connected to an overrunning clutch, wherein said coupling means includes an overrunning clutch.

7. The power generator of claim 1, comprising more than drive units, wherein said coupling means includes a crankshaft, each of said drive units being connected to a throw of said crankshaft, wherein the reciprocating motion of said drive units is converted to rotating motion of said crankshaft.

8. The power generator of claim 1, wherein said accelerator gear box unit includes one or more one or more items selected from the group consisting of pulley wheel sand belts, fixed-ratio linear helical gearboxes, and chain rings and chains.

9. The power generator of claim 1, wherein said accelerator gear box unit includes more than one.

10. The power generator of claim 1, further comprising a power conditioner, an input of said power conditioner being connected to an output of said electric generator, and an output of said power conditioner being connected to a battery device, said power conditioner being adapted to charge said battery device.

11. The power generator of claim 10, further comprising an inverter, an input of said inverter being connected to said battery device, and power output of said inverter being suitable for household electric use.

\* \* \* \* \*